United States Patent
Zhang et al.

(10) Patent No.: US 9,113,362 B2
(45) Date of Patent: Aug. 18, 2015

(54) METHOD AND APPARATUS TO SEPARATE COVERAGE LIMITED AND CO-CHANNEL LIMITED INTERFERENCES

(75) Inventors: Ming Zhang, Bellevue, WA (US); Gaviphat Lekutai, Kirkland, WA (US); Donald C. Hjort, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 995 days.

(21) Appl. No.: 11/638,240

(22) Filed: Dec. 12, 2006

(65) Prior Publication Data

US 2008/0139196 A1 Jun. 12, 2008

(51) Int. Cl.
| | |
|---|---|
| *H04B 15/00* | (2006.01) |
| *H04B 1/04* | (2006.01) |
| *H04B 7/00* | (2006.01) |
| *H04B 1/10* | (2006.01) |
| *H04W 24/08* | (2009.01) |

(52) U.S. Cl.
CPC ..................................... *H04W 24/08* (2013.01)

(58) Field of Classification Search
CPC ....... H04W 24/00; H04W 24/08; H04M 3/36; H04B 10/0795; H04B 10/07953; H04B 15/00; H04B 15/02
USPC ............. 455/423, 464, 513, 405, 63.1, 67.13, 455/114.2; 370/317, 252
See application file for complete search history.

(56) References Cited

U.S. PATENT DOCUMENTS

| | | | |
|---|---|---|---|
| 5,825,521 A * | 10/1998 | Ogawa et al. ................... 398/27 |
| 5,937,333 A * | 8/1999 | Sexton et al. ................... 455/73 |
| 6,014,373 A | 1/2000 | Schilling et al. | |
| 6,141,565 A * | 10/2000 | Feuerstein et al. ............ 455/560 |
| 6,393,277 B1 * | 5/2002 | Sahin et al. .................... 455/423 |
| 6,609,001 B2 * | 8/2003 | Kline et al. .................... 455/423 |
| 6,735,436 B1 * | 5/2004 | McCauley et al. ............ 455/424 |
| 7,460,835 B1 * | 12/2008 | Petrus ........................ 455/67.11 |
| 2004/0022396 A1 * | 2/2004 | Higgs ............................ 381/78 |
| 2006/0171346 A1 | 8/2006 | Kolavennu et al. | |

OTHER PUBLICATIONS

International Search Report and Written Opinion for PCT/US07/84133, Apr. 9, 2008, copy consists of 8 pages.

* cited by examiner

*Primary Examiner* — Michael Mapa

(57) ABSTRACT

Coverage and usage-based limitations to a wireless communications network can be estimated by monitoring network performance during a periods in which the network is relatively busy and relatively non-busy. For example, differences in distributions of bit error rates for calls in such time periods can be used to assess whether network limitations are associated with reduced-coverage zones or are usage-based. Such estimates can be used to target specific network features that limit network performance.

7 Claims, 4 Drawing Sheets

FIG. 3
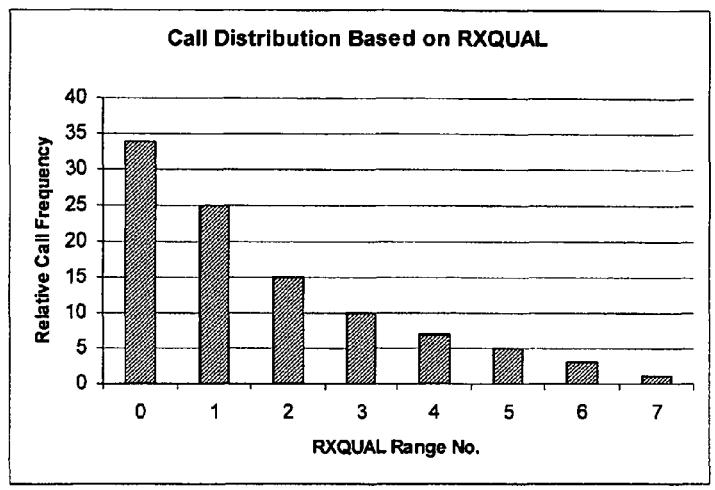
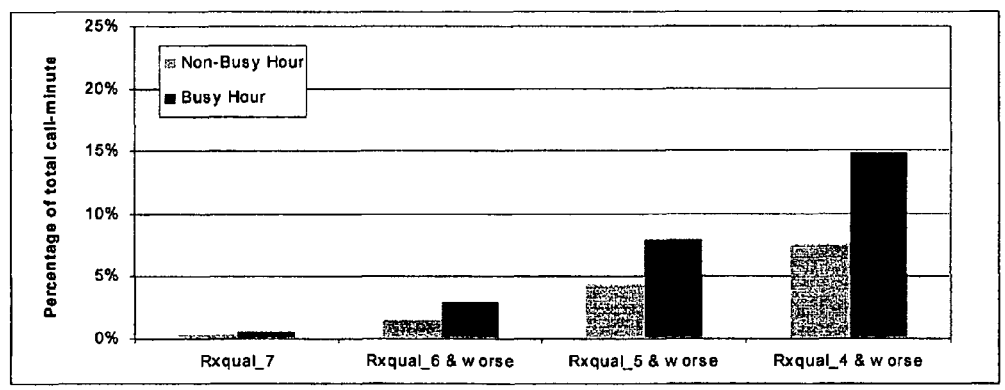
FIG. 4

__METHOD AND APPARATUS TO SEPARATE COVERAGE LIMITED AND CO-CHANNEL LIMITED INTERFERENCES__

FIELD

The disclosure pertains relates to network diagnostics for wireless communication networks.

BACKGROUND

Wireless communication networks are currently used for a broad range of business and personal communications needs. Wireless network subscribers have grown accustomed to ready access to telephone, messaging, and data services regardless subscriber location or subscriber travel. Because of the increased reliance of subscribers on wireless networks, subscribers insist on services being available at all times at any arbitrary location. Unfortunately, network design can occasionally be inadequate to provide a requested service, frustrating network subscriber.

While network operators have long emphasized providing reliable services to their subscribers, diagnosing the reasons for any particular communication problem is difficult. In many wireless networks, dropped calls or other missed or incomplete data or voice communications are associated with limitations to network coverage. Limited coverage problems arise because of local topography (e.g., hills) or structures (office towers) that block or obscure some portions of a coverage area (typically one or more cells) from receiving suitable radio signals from a network radio tower or other transmitter. In some cases, tower placement is less than ideal because of an inability to secure necessary property permissions, or any of a variety of other practical or political reasons result in cell towers unavoidably being placed in locations that provide less than optimum continuous coverage. Thus, "holes" in coverage are creates in which subscriber mobile stations are either too far away from cell towers or are blocked or partially blocked from cell towers by terrain or buildings. These holes appear as dead spots where mobile stations are unable to acquire a sufficient signal to sustain two-way communications. A user of a mobile station entering one of these holes while engaged in a call will often experience progressively worsening signal reception, resulting in either disruptions in communications or call termination.

Other communications problems are associated with a number of subscribers using the network or requesting network services. For example, in some wireless networks, unique sets of radio frequencies are assigned to each base station. Because only a finite number of frequencies are available, frequencies are used at multiple base stations and are generally allocated according to frequency reuse plans in order to avoid different signals on the same frequency from appearing at the same transmitter or receiver. Although an ideal frequency reuse plan can be derived from propagation models, such a plan is only effective to the extent cell arrangement reflects an idealized layout where each cell is spaced according to a uniform honeycomb pattern, with all cells having the same geographic elevation and flat topography. In practice, cells are irregularly shaped and spaced, yielding to the varying nature of terrain and the practicalities of securing suitable base station locations. Even an ideal layout cannot prevent more than one radio signal at a common frequency from appearing in a particular cell, but merely provides reduced amplitudes of any unwanted radio frequency signals. Thus, so-called co-channel interference arises when two or more different transmitting stations (mobile or stationary) in relatively proximate areas both use the same radio frequency channel. Like holes in coverage, co-channel interference can produce degraded signal reception or call termination.

Network operators strive to prevent dropped calls and other missed communications due to limited network coverage or excess communication demand. For holes in geographic coverage, wireless operators can install additional transmitter or change a location or transmission direction of an existing transmitter. Co-channel interference effect can be reduced base on, for example, adjustments to a frequency reuse plan. However, for such modifications to be effective, the source of any communications limitations should be identified as being associated with coverage deficiencies or capacity limits. Conventional methods of assessing network performance are based on drive tests in which a transmitter/receiver is driven through a network coverage area. Such drive testing is slow, expensive. Therefore, improved methods of diagnosing network communication limitations are needed.

SUMMARY

Methods for providing a metric that is indicative of usage-based and coverage-based wireless network limitations are provided. Such methods permit identification of, for example, transmitter placement or frequency reuse associated contributions to network error rates or dropped calls. Based upon estimates of such a metric, a network operator can identify possible network modifications to improve overall network performance.

In some examples, a distribution of call bit error rates are assigned to error rate ranges referred to as RXQUAL ranges. Distributions are generally obtained for two different time period such as a time period in which the network is busy and a time period in which the network is non-busy. In some networks, network limitations due to reduced coverage in one or more cells or cell sectors are generally relatively independent of call volume, i.e., a constant fraction of calls tend to experience coverage-based limitations for a relatively constant geographic call distribution. Usage-based effects such as co-channel interference tend to increase as a function of network load so that comparison between busy and non-busy times can be used to estimate relative contributions of coverage and usage based effects. Received signal quality values (RXQUAL) that are commonly available can be used to produce cumulative distributions of errors for such time periods, and a relative contribution of, for example, co-channel interference can be determined based on a comparison of the distribution functions for these two time periods.

Network characterization methods comprise establishing a performance metric and determining values of the performance metric associated with a first time interval and a second time interval. Based on the determined values, a contribution of at least one network feature to at least one of the performance metrics in at least one of the first and second time intervals is estimated and reported. In some examples, the performance metric is associated with bit error rate. In other examples, the first time interval is associated with a time period during which network usage is relatively low, and the second time interval is associated with a time period during which network usage is relatively high. According to other examples, the estimated contribution is associated with reduced-coverage zones, co-channel interference, or multiple access interference. In representative illustrative examples, the performance metric is associated with a cumulative distribution function based on two or more bit error rate ranges. In some examples, the performance metric is based on received signal quality or a cumulative distribution function based on two or more ranges of received signal quality.

Apparatus comprise a processor configured to receive values of a performance metric associated with a first time interval and a second time interval and produce an estimate of at least one of a coverage-base contribution to the performance metric or a usage-based contribution to the performance metric, and report the estimate. In some examples, a memory is configured to receive the estimate, and the processor is coupled to retrieve the values from the memory. In representative examples, the usage-based contribution is associated with co-channel interference or multiple access interference. In further examples, the processor is configured to determine a first cumulative distribution function based on bit error rate during the first time interval and a second cumulative distribution function based on bit error rate during the second time interval, and produce the estimate based on the first and second cumulative distribution functions. In other examples, the processor is configured to determine the performance metric.

Methods are provided that comprise estimating at least one of a contribution of usage-based limitations or coverage-based limitations to wireless network performance. Based on the estimate, at least one wireless network element associated with the at least one estimated limitation is reconfigured. In other examples, a contribution of usage-based limitations and reduced-coverage zone based limitations in a wireless network are estimated, and at least one wireless network element is reconfigured based on the estimated contributions. In some examples, the estimate is based on a comparison of wireless network performance in at least a first and a second time interval. In other examples, the usage-based limitations are associated with co-channel interference, and methods further comprise modifying a frequency reuse scheme based on the estimate. In other examples, a transmitter placement is adjusted or an additional transmitter is provided based on the estimate.

The foregoing and other objects, features, and advantages of the disclosed technology will become more apparent from the following detailed description, which proceeds with reference to the accompanying figures.

BRIEF DESCRIPTION OF THE DRAWINGS

FIG. 3 is a graph illustrating a distribution of calls based on received signal quality ranges.

FIG. 4 is a graph illustrating cumulative distribution functions of calls into received signal quality ranges for a busy time interval and a non-busy time interval.

DETAILED DESCRIPTION

Figure 1:
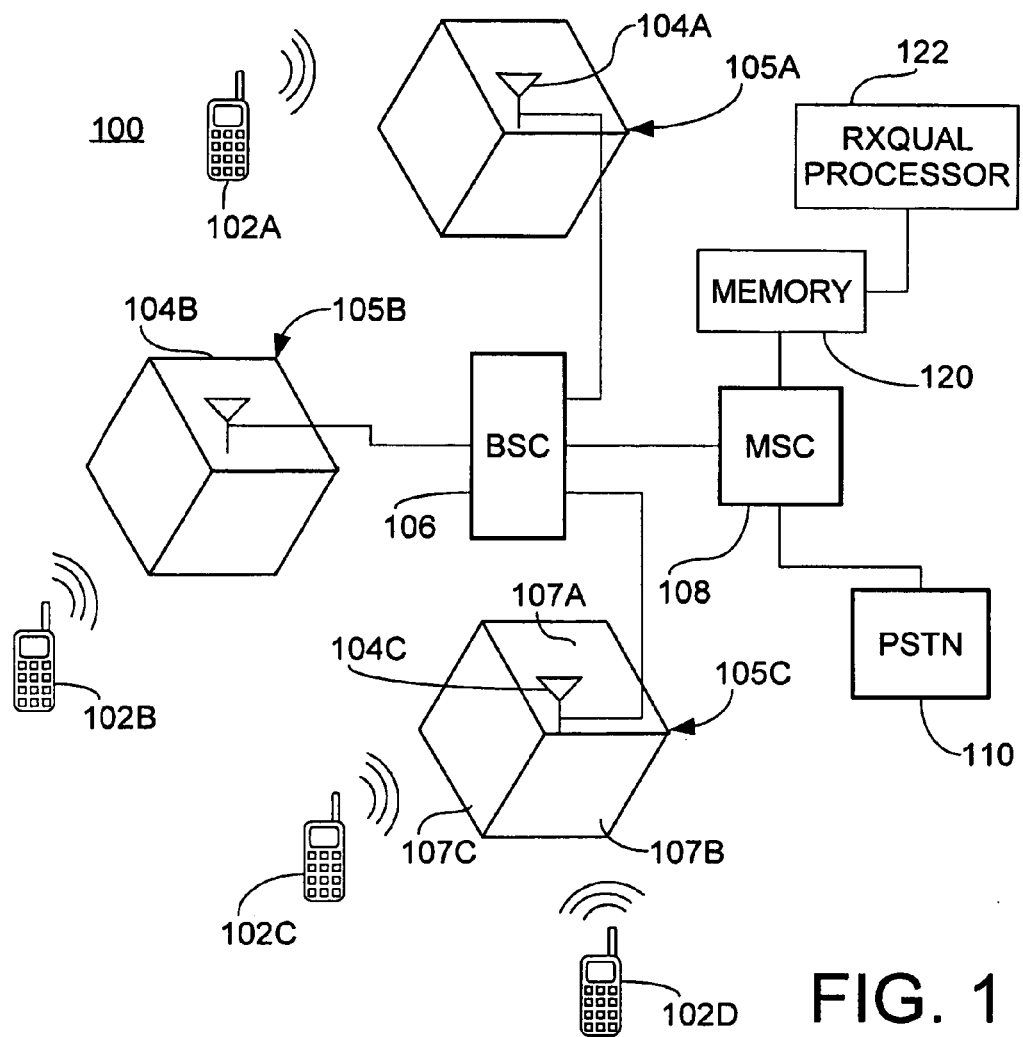
FIG. 1 is a diagram of a representative wireless communication network that includes a processor configured to estimate coverage-based and usage-based limitation to network performance.

As used in this application and in the claims, the singular forms "a," "an," and "the" include the plural forms unless the context clearly dictates otherwise. Additionally, the term "includes" means "comprises." Further, the term "coupled" means electrically or electromagnetically coupled or linked and does not exclude the presence of intermediate elements between the coupled items.

The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some communication networks such as, for example, wireless communication networks that provide telephone and data services over large coverage areas, calls or other communications can be dropped or slowed or services can be unavailable because of subscriber location relative to network access points such as radio base stations. For example, a subscriber can be located at a "hole" in a network coverage area caused by buildings or other structures situated between the subscriber and a radio transmitter. For convenience herein, locations or areas in a network coverage area that are associated with impaired network communication based on their locations are referred to as reduced-coverage zones. In some examples, reduced-coverage zones correspond to areas in which subscriber services are unavailable, but typically, such zones are associated with areas at which communication with the network is impaired, but services remain available.

Communication networks such as wireless communication networks also exhibit limitations based on numbers of subscribers using or requesting services, or numbers of communications requested or being serviced. For example, a wireless network subscriber can experience degraded network services due to service requests by other subscribers, particularly if all the service requests originate at or near a common location or use a common frequency channel. For convenience, such communication limitations are referred to herein generally as usage-based impairments. Such usage-based impairments can include those associated with a limited number of frequencies or time slots in a particular cell, or interference with communications at a common (reused) frequency in a distant cells such as prescribed by a frequency reuse plan. In other examples, such impairments are associated with increasing numbers of users in a wireless network based on code division multiple access (CDMA) and can be referred to as multiple access interference.

In representative examples described herein, applications of the disclosed technology to cellular networks based on frequency division multiple access (FDMA) and time division multiple access (TDMA) such as GSM networks as well as CDMA based networks such as those specified by the IS-95 standard are described. These network configurations are chosen for convenience only, and other FDMA/CDMA-based or other networks can be similarly evaluated for reconfiguration.

Referring to FIG. 1, a wireless communication network 100 includes a plurality of mobile stations 102A-102D, each of which is configured for wireless communication with one or more of a plurality of base transceiver stations (BTS) 104A-104C that are associated with respective cells 105A-105C. In a typical network, a plurality of cells establish a network coverage area in which wireless services are generally available. In some wireless communication networks based on standards such as the Digital Advanced Mobile Phone System (D-AMPS) and the Global System for Mobile Communications (GSM), each BTS is allocated a particular set of frequency bands on which it transmits and receives. The cells 105A-105C can be divided into sectors and each sector allocated a subset of frequency bands selected from the set allocated to the BTSs 104A-104C, respectively. For example, if the cell 105C is assigned nine frequency bands $f_1, \ldots, f_9$, sectors 107A-107C can be assigned frequency subsets $f_1$-$f_3$, $f_4$-$f_6$, and $f_7$-$f_9$, respectively. Because of limitations of available spectrum, the frequency bands $f_1, \ldots, f_9$ are used (i.e., "reused") in one or more other cells, and generally assigned to sectors in a similar manner.

A base station controller (BSC) 106 is coupled to the BTSs 104A-104C and generally coordinates communications with the BTSs 104A-104C. For example, the BSC 104 can coordinate frequency allocation with the mobile stations. The BSC 104 can also coordinate hand-off of calls between cells as the mobile stations move. A mobile switching center (MSC) 108 can be coupled to the BSC 104 and other BSCs. The MSC 108 coordinates communications between mobile stations and between mobile stations and a public switched telephone network (PSTN) 110 that provides access to a global telecommunications network or other communication networks. The MSC 108 can also coordinate hand-off.

An available frequency spectrum can be allocated to the cells or a coverage area in various ways. Some exemplary networks use Frequency-Division Multiple Access (FDMA), wherein an allocated radio frequency spectrum is divided into a plurality of sub-bands. Examples of such standardized networks include AMPS for analog systems and DAMPS and GSM digital systems. DAMPS and GSM use FDMA in conjunction with Time-Division Multiple Access (TDMA), wherein the frequency sub-bands provided by DAMPS or GSM are divided into time slots. Other allocations of frequencies are possible, and the disclosed technology is not limited to any particular frequency assignment scheme. In addition, as discussed below, in some examples, a radio frequency spectrum assigned to a network operator is not divided into bands, sub-bands, or sets of frequency bands, and communications are distinguished based on a code assigned to a particular device or communication.

One or more network elements such as the BSCs or MSC of FIG. 1 can be configured to record network communication statistics as a function of time for use in assessing network performance and identifying potential areas for network reconfiguration. For example, numbers of calls or other communications having selected bit error rates can be recorded as a function of time. Based on the recorded numbers, network performance limitations can be associated with reduced coverage-zones or as usage-based limitations as described below. As shown in FIG. 1, such data is stored in a memory 120, and coupled to a processor 122 for analysis.

Figure 2:
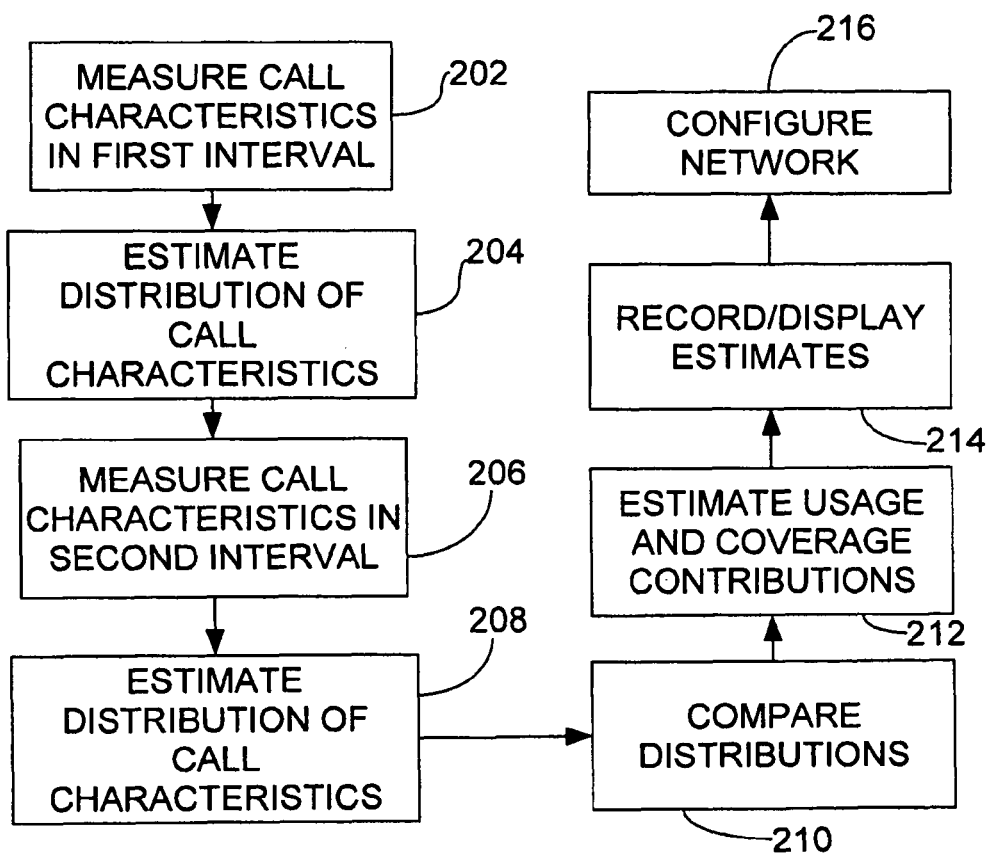
FIG. 2 is a block diagram illustrating a representative method of estimating coverage-based and usage-based network performance limitations.

With reference to FIG. 2, a representative method is illustrated. In a step 202, a bit error rate or other call or data connection characteristic is measured for a plurality of calls or other communications in a first time interval and in a selected coverage area. The bit error rate can be recorded for some or all communications or alternatively, a bit error rate for a particular communication can be assigned to one of a set of predetermined bit error rate ranges so that a total count of calls having a bit error rate in one or more of the ranges can be established. In a representative example, a set of received signal quality (RXQUAL) ranges are established, wherein the RXQUAL ranges are based on call bit error rates. Bit error rates for each of a set of calls can be assigned to one of the RXQUAL ranges based on the call bit error rate, and a first distribution of calls as a function of bit error rate range (RXQUAL ranges) during the first time interval is obtained in a step 204. Call bit error rate is typically measured about every 480 ms, so that any call can contribute a number of samples to the RXQUAL ranges.

In a step 206 a bit error rate or other characteristic is recorded for a plurality of calls in a second time interval. The bit error rates associated with call measurements can be assigned to the RXQUAL ranges, and a second distribution of calls obtained in a step 208. Typically the first time interval is selected so that the network is relatively "non-busy" during the first time interval, and the second time interval is selected so that the network is relatively busy during the second time interval. For many wireless networks, non-busy times can be associated with late night hours (1-3 AM) or very early morning hours (4-6 AM), and busy times can be associated with late afternoon hours (4-6 PM). Based on the first and second distributions, associated first and histograms can be obtained by normalizing the distributions based on a total number of calls.

In a typical example, eight RXQUAL BER ranges $RXQUAL_n$, wherein $n=0, \ldots 7$, are provided, wherein $n=0$ corresponds to calls having a highest quality (lowest bit error rate). Increasing values of the integer index n are associated with progressively poorer received signal quality. A convenient set of RXQUAL ranges is illustrated in the following table.

| RXQUAL Ranges | |
|---|---|
| $RXQUAL_n$ | Bit Error Rate (BER) Range |
| 0 | 0.0% ≤ BER < 0.2% |
| 1 | 0.2% ≤ BER < 0.4% |
| 2 | 0.4% ≤ BER < 0.8% |
| 3 | 0.8% ≤ BER < 1.6% |
| 4 | 1.6% ≤ BER < 3.2% |
| 5 | 3.2% ≤ BER < 6.4% |
| 6 | 6.4% ≤ BER < 12.8% |
| 7 | 12.8% ≤ BER |

The threshold levels establishing each bin are typically determined using mean-opinion-score (MOS) evaluations, where an MOS less than 3 is considered a degraded signal. Methods associated with so-called "Perceptual Evaluation of Speech Quality" as specified in, for example, ITU-T Recommendation P.862 can be used to select a suitable threshold level.

Once RXQUAL ranges are selected and numbers of call samples in each of the ranges have been obtained as a set of values $RXQUAL_n$, a cumulative distribution function CDF can be determined as a function of n to yield a percentage of call samples that have a BER (and an associated signal quality) at least as poor as that associated with $RXQUAL_n$ in a selected time interval T:

$$CDF(n, T) = \frac{\sum_{i=n}^{7} RXQUAL_i}{\sum_{i=0}^{7} RXQUAL_i},$$

wherein i is an integer. While it can be convenient to obtain values of the CDF for all ranges (i.e., for all values of n), in some examples one or a few values can be selected to provide an indicator of network performance in one or more time intervals.

The start and stop times of the first time interval ($T_1$) can be selected so as to reduce or minimize effects of network load, thereby reducing, minimizing, or eliminating call degradations associated with co-channel interference or other network traffic-based degradations. Thus, in such a time interval, call degradations can be associated with network coverage limitations or other network architecture limitations that are independent of network traffic volume. As noted above, for a typical wireless cellular telephone network, a time period during early morning hours often is suitable such as from about 4 AM to about 5 AM. Start time and duration can be selected based on a particular network's traffic patterns.

A second histogram is generated for a time interval associated with a relatively heavy network traffic, and a CDF (or a partial CDF) based on call samples placed during this time interval is computed and compared with a similar CDF for the non-busy time interval in a step 210. Selection of a start time and duration can be selected to correspond to periods of peak network traffic or other period. If a peak traffic time is selected, then the associated CDF can include a largest anticipated contribution to call degradation produced by co-channel interference or other traffic based degradations. In other examples, other periods of moderate usage between peak usage and minimum usage can be monitored to yield a contribution of co-channel interference or other network usage-based limitation as a function of network load. In some examples, CDFs for a plurality of time intervals can be obtained so that contributions to call degradation from network traffic dependent sources such as co-channel interference can be estimated. Alternatively, normal network traffic variations at a common time of day can be used to determine relative contributions of coverage-based and traffic-based limitations. For example, day to day variations in CDF at a selected time of day can be correlated with variations in total traffic at the selected time of day.

In other examples, call or other communication data collected at a common time of day can be used to estimate usage-based limitations and limitations associated with reduced-coverage zones by recording a geographic distribution of calls or recording frequency assignments. In such an example, increases in error rates associated with more compact geographic distributions or higher rates of reuse of particular frequencies can be associated with usage-based limitations such as co-channel interference. Typically such data is stored in a memory for ready access, or selected values of the associated distribution functions can be recorded.

In the example of FIG. 2, a contribution of co-channel interference or reduced-coverage limitations for a given call quality can be determined in a step 212 by, for example, subtracting the computed non-peak CDF from the CDF computed for a period of higher network load. If the relative geographic distribution of callers remains approximately constant, the additional contribution to the percentage of calls falling below a given RXQUAL level during a high network load period as compared to low network load period can be associated with one or more usage-based limitations. Typical examples of such limitations include co-channel interference in FDMA systems, or multiple access interference in CDMA systems. As used herein, co-channel interference includes interference based on reuse of the same frequency channel, interference between adjacent or relatively close channels, and other frequency related interference.

FIG. 3 is a graph illustrating a representative distribution of calls into RXQUAL ranges. Distributions such at that of FIG. 3 can be processed to produce CDFs or other assessment metrics. FIG. 4 illustrates results of a representative network assessment based on call distributions according to a method such as that of FIG. 2. As shown in FIG. 4, cumulative distribution functions for a busy and non-busy time period are graphed as a function of RXQUAL ranges. An increase in the CDF for a given RXQUAL that is associated with the busy time can be used as an estimate of a relative contribution of usage-based limitations to overall network performance. As illustrated in FIG. 4, contributions of reduced-coverage zones and co-channel interference are approximately equal. In some examples, contributions are substantially different. As shown in the FIG. 4, the relative contributions of reduced-coverage zones and usage-based limitations are approximately constant as a function of RXQUAL range, but in other differences, the differences are functions of RXQUAL.

In other examples, BER measurements associated with selected groups of cells can be used to assess co-channel interference or other network limitations for the selected portion of a coverage area. In this way, a network operator can pinpoint specific areas of a wireless network where either co-channel interference is excessive or reduced-coverage zones appear to be limiting network performance so that appropriate remedial measures can be implemented.

Figure 5:
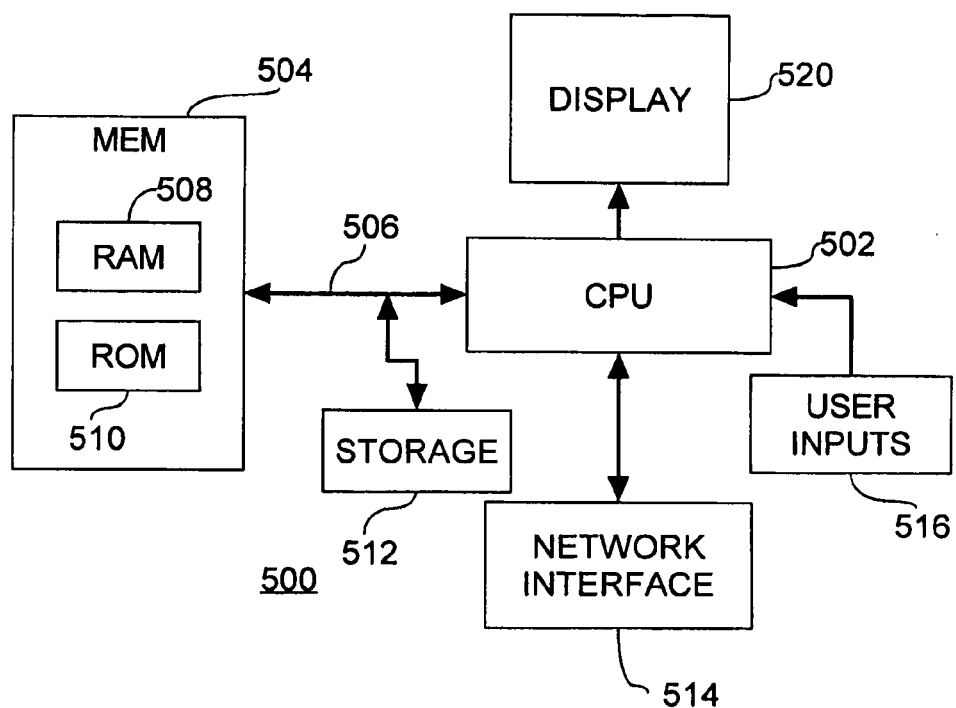
FIG. 5 is a block diagram illustrating a representative computer system configured to display and report estimates of coverage-based or usage-based network performance limitations.

Turning to FIG. 5, a representative typical computer system 500 suitable for estimating and reporting usage-based or coverage-based network performance characteristics includes a central processing unit (CPU) 502 that is in communication with a system bus 504. A memory 506 is coupled to the system bus 504 and can include read-only memory (ROM) 510 and random-access memory (RAM) 508. Other computer readable media can also be included such as a storage device 512 that stores computer-executable instructions for delivery to the CPU 502. The storage device 512 can be a hard disk, a floppy disk, CD ROM, or other storage device, or some portions of the memory 506 can be configured to store such instructions. A network interface 514 is provided for communication with a network such as a wireless network in order to receive network statistics such as RXQUAL-based call distributions or other data or distributions. A user input device 516, such as a mouse or keyboard, is provided for user selection of network characteristics to be monitored or processed, time intervals in which call or data communication characteristics are to be accumulated, or other data collection or network assessment parameter. A display 520 is generally provided to report network performance evaluations to a network technician.

In some examples, a user menu is presented on the display 520 to aid in selection of time intervals in which bit error rate range counts or other measurements are to be obtained. Such a user interface can also provide entries associated with selection of other network operational data such as numbers of dropped calls, effective data rate for a particular call or an average effective data rate, data latency, bit error rate, or other network characteristics that can be used to produce appropriate network statistics for distinguishing coverage and traffic-based network limitations. Typically, any statistical or other measured or computed values can be reported by display on the display device 520, stored in a memory, or otherwise presented to network personnel for additional network planning or to aid in network reconfiguration. For example, coverage-based or traffic-based probabilities for dropping calls in one or more cells can be displayed, or a list of cells exhibiting predominately coverage-based or traffic-based communication can be provided. Once the relative importance of coverage and traffic-based limitations have been assessed, some cells or other network portions can be identified for additional radio towers or relocation of an existing tower. Alternatively, frequency assignments can be altered to reduce co-channel interference if co-channel interference is determined to be a signification network limitation.

While FIG. 5 illustrates a stand-alone computer system, such a system can be distributed throughout a wireless network or other network or situated at a single network node. Network elements such as mobile stations can be configured as shown in FIG. 5, and a dedicated system is not required. For example, the computer system can be based on network elements of a wireless communications network, including mobile stations, ground stations, ground station controllers, or network switching or monitoring systems. Bit error rate, bit error rate ranges, or other network performance parameters can be measured, stored, and communicated from one or more such network elements, or communicated via the Internet or other network to another processing system for storage, display, and identification of potential network reconfigurations based on likely sources of call errors.

Representative examples presented above are based on bit error rates of calls on wireless networks that use FDMA. In some network architectures FDMA is not used, but the disclosed technology permits differentiation of traffic capacity based limitations and coverage-based limitations in other networks as well. For example, in a wireless network based on a so-called Code Division Multiple Access (CDMA), mobile stations are typically assigned a unique code but transmit and receive over a shared radio frequency spectrum. As network traffic increases, so-called multiple access interference (MAI) increases due to the presence of communications based on increasing numbers of codes. Thus, a signal-to-interference ratio tends to decrease as a number of users increases. In CDMA-based networks, coverage-based or usage-based communications limitations such as dropped calls can be identified by assessing network performance during busy and non-busy time intervals.

Network characterization can be based on voice calls or other communications such as data communications or text messaging. In addition, other call or communication quality indicators can be used such as, for example, effective bit rate, latency, or other indicators As noted above, during non-busy time intervals, coverage limitations are likely to be apparent while in busy time intervals, usage-based limitations are likely to be apparent. While it can be convenient to assess network performance based on busy and non-busy time intervals, any two time intervals having different usages can be used. A comparison of network performance based on, for example, cumulative distribution functions, for different time intervals can provide an estimate of contributions of coverage-based or usage-based limitations.

In view of the many possible embodiments to which the principles of the disclosed technology may be applied, it should be recognized that the illustrated embodiments are only representative examples and should not be taken as limiting. We therefore claim as our invention all that comes within the scope and spirit of these claims.

We claim:

1. A method for estimating a level of contribution of an interference to a performance metric in a wireless network, comprising:

establishing, by a processor, the performance metric, wherein the performance metric comprises a bit error rate;

determining, by the processor, a first cumulative distribution function of the performance metric associated with a first time interval and a second cumulative distribution function of the performance metric associated with a second time interval, wherein the first time interval is associated with a time period during which network usage is low as compared to the second time interval, and the second time interval is associated with a time period during which network usage is high as compared to the first time interval, wherein a cumulative distribution function comprises a percentage of call samples during a given time interval that have a bit error rate that is greater than or equal to a given bit error rate of a received signal quality range of a plurality of received signal quality ranges;

producing, by the processor, an estimate of the level of contribution of the interference to the performance metric in the second time interval, by subtracting the first cumulative distribution function of the performance metric associated with the first time interval from the second cumulative distribution function of the performance metric associated with the second time interval, wherein the interference comprises a co-channel interference; and reporting, by the processor, the estimate of the level of contribution of the interference to the performance metric in the second time interval.

2. An apparatus, comprising:

a processor; and a computer-readable medium storing instructions which, when executed by the processor, cause the processor to perform operations, the operations comprising:

receiving a first cumulative distribution function of a performance metric associated with a first time interval and a second cumulative distribution function of the performance metric associated with a second time interval, wherein the performance metric comprises a bit error rate in a wireless network, wherein the first time interval is associated with a time period during which network usage is low as compared to the second time interval, and the second time interval is associated with a time period during which network usage is high as compared to the first time interval, wherein a cumulative distribution function comprises a percentage of call samples during a given time interval that have a bit error rate that is greater than or equal to a given bit error rate of a received signal quality range of a plurality of received signal quality ranges;

producing an estimate of a level of contribution of an interference to the performance metric in the second time interval by subtracting the first cumulative distribution function of the performance metric associated with the first time interval from the second cumulative distribution function of the performance metric associated with the second time interval, wherein the interference comprises a co-channel interference; and reporting the estimate of the level of contribution of the interference to the performance metric in the second time interval.

3. The apparatus of claim 2, further comprising a memory configured to receive the estimate of the level of contribution.

4. A method, comprising:
 estimating, via a processor, a level of contribution of an interference to a performance metric in a wireless network, wherein the performance metric comprises a bit error rate, wherein the interference comprises a co-channel interference, wherein the estimating is based on a comparison of a first cumulative distribution function of the performance metric in a first time interval and a second cumulative distribution function of the performance metric in a second time interval, wherein a cumulative distribution function comprises a percentage of call samples during a given time interval that have a bit error rate that is greater than or equal to a given bit error rate of a received signal quality range of a plurality of received signal quality ranges, wherein the estimating comprises subtracting the first cumulative distribution function of the performance metric associated with the first time interval from the second cumulative distribution function of the performance metric associated with the second time interval, wherein the first time interval is associated with a time period during which network usage is low as compared to the second time interval, and the second time interval is associated with a time period during which network usage is high as compared to the first time interval; and
 based on the level of contribution that is estimated, reconfiguring a wireless network element.

5. The method of claim 4, further comprising:
 modifying a frequency reuse scheme based on the level of contribution that is estimated.

6. The method of claim 4, further comprising:
 adjusting a transmitter placement based on the level of contribution that is estimated.

7. The method of claim 4, further comprising:
 adding an additional transmitter based on the level of contribution that is estimated.

\* \* \* \* \*